(12) United States Patent
Danskine et al.

(10) Patent No.: US 8,287,208 B2
(45) Date of Patent: Oct. 16, 2012

(54) WAVE ATTENUATION SYSTEMS

(75) Inventors: Allen J. Danskine, Bow, WA (US); David H. Rytand, Anacortes, WA (US); Daniel J. Jankelson, Anacortes, WA (US); Justin W. Rawls, Anacortes, WA (US)

(73) Assignee: David H. Rytand, Anacortes, WA (US)

( * ) Notice: Subject to any disclaimer, the term of this patent is extended or adjusted under 35 U.S.C. 154(b) by 0 days.

(21) Appl. No.: 12/700,666

(22) Filed: Feb. 4, 2010

(65) Prior Publication Data

US 2010/0196098 A1  Aug. 5, 2010

Related U.S. Application Data

(60) Provisional application No. 61/149,986, filed on Feb. 4, 2009, provisional application No. 61/173,142, filed on Apr. 27, 2009.

(51) Int. Cl.
*E02B 3/06* (2006.01)

(52) U.S. Cl. ............... 405/21; 405/25; 405/26; 405/219

(58) Field of Classification Search .................... 405/21, 405/25–27, 30, 35, 285, 219, 63, 64; 114/264, 114/266, 267, 240 R–240 E; 290/42, 53; 256/12.5, 13; 441/133, 134
See application file for complete search history.

(56) References Cited

U.S. PATENT DOCUMENTS

| 817,904 A | 4/1906 | Cook |
| 1,821,320 A * | 9/1931 | Plummer ...................... 114/292 |
| 2,658,350 A | 11/1953 | Magill |
| 2,716,959 A | 9/1955 | Betts et al. |
| 3,011,316 A | 12/1961 | Wilson |
| 3,953,904 A * | 5/1976 | Fry ................................. 441/45 |

(Continued)

FOREIGN PATENT DOCUMENTS

| EP | 1696079 A2 | 8/2006 |
| JP | 11229322 A * | 8/1999 |

OTHER PUBLICATIONS

International Search Report and Written Opinion of the International Searching Authority, mailed Oct. 6, 2010, for corresponding International Application No. PCT/US2010/023244, 10 pages.

(Continued)

*Primary Examiner* — John Kreck
*Assistant Examiner* — Sean Andrish
(74) *Attorney, Agent, or Firm* — Klarquist Sparkman, LLP (57) ABSTRACT

Wave attenuation systems are disclosed. For example, a wave-attenuating panel can define a plane, a center-of buoyancy and a center-of-mass spaced from the center-of-buoyancy such that the panel is stably buoyant in a liquid with the plane oriented vertically. Wave attenuators are also disclosed. Such a wave attenuator can comprise a first row of support members extending vertically relative to a seabed and a second row of support members spaced from the first row. A vertically oriented, movable panel can be positioned between the first row and the second row, such that the panel is configured to rise and fall in a substantially vertical plane. Such wave attenuators can also comprise a second, fixed panel that remains submerged.

26 Claims, 9 Drawing Sheets

U.S. PATENT DOCUMENTS

| | | | |
|---|---|---|---|
| 4,027,486 A | | 6/1977 | Dougherty |
| 4,950,104 A | * | 8/1990 | Streichenberger ............ 405/24 |
| 5,634,742 A | * | 6/1997 | Mills ............................. 405/87 |
| 5,827,011 A | | 10/1998 | Kann |
| 6,715,958 B2 | | 4/2004 | Wittenberg et al. |
| 7,390,141 B2 | | 6/2008 | Rytand |
| 2005/0058509 A1 | | 3/2005 | Steinberg |
| 2005/0271470 A1 | | 12/2005 | Rytand |

OTHER PUBLICATIONS

Floating Breakwaters—Coastal Wiki article, located at: http://www.coastalwiki.org/coastalwiki/Floating_breakwaters (6 pages), retrieved from the internet on Jan. 25, 2010.

* cited by examiner

WAVE ATTENUATION SYSTEMS

CROSS REFERENCE TO RELATED APPLICATIONS

This application claims priority to U.S. Provisional Patent Application No. 61/149,986 filed on Feb. 4, 2009, and U.S. Provisional Patent Application No. 61/173,142 filed on Apr. 27, 2009, each of which is incorporated herein in its entirety.

FIELD

This application concerns wave attenuation systems, such as, for example, wave attenuators comprising a floating member.

BACKGROUND

Small craft harbors with either fixed or floating docks require a relatively calm water environment, lest the moored vessels become damaged by wave-induced impacts with each other and/or the mooring facilities. A 'relatively calm' wave environment is understood to be one permitting a maximum of one and one-half feet in wave height in a 100-year storm event. To achieve this state of protection, breakwaters have been used to prevent entry of wave energy into boat harbors. Typically, unless they are of the rock and earth fill variety, called "rubble-mound", these structures fall into two categories: floating and fixed.

Floating breakwaters (which are more properly referred to as "attenuators") have always had serious limitations. Their effectiveness has been a function of their sheer size (width and depth) as it relates to the wave they are meant to block, moderate or attenuate. Unless they are of deep draft (on the order of one-half of the water depth), or extremely wide in a wave direction of travel (at least one-half of the wave length), floating breakwaters have been only marginally effective in reducing transmitted wave energy to acceptable levels.

A "good" floating attenuator is said to be one that transmits no more than 50 percent of the incoming wave energy. A wave attenuator's transmission coefficient (i.e., a ratio of a wave's energy after interacting with the wave attenuator to the wave's energy before interacting with the wave attenuator) provides one measure of the wave attenuator's effectiveness. A wave attenuator having a transmission coefficient less than about 0.50 (i.e. a wave's energy after interacting with a wave attenuator measures less than about 50% of the wave's energy before interacting with the attenuator) has historically been considered an effective wave attenuator.

In tidal conditions, the historically poor performance of floating wave attenuators has been exacerbated by the effect of increasing and decreasing water level on attenuation performance. For example, a float drawing six feet at a low-tide water depth of 12 feet (one-half of the water column) will be unable to provide the same degree of protection at a high-tide water depth of, say 25 feet (one-quarter of the water column). Accordingly, effectiveness of wave attenuation at high tide has been significantly diminished (e.g., compared to the effectiveness at low-tide).

In addition, wave period can vary with tide, even when the waves stem from a same-speed wind. Wave periods (and wavelengths) tend to be longer over deep water than shallow water. Thus, a floating wave attenuator having a width of about one-half of a wavelength at low tide will extend over the surface by a much lower percentage of the wavelength at high tide. Previous floating wave attenuators have thus had poor wave attenuation effectiveness under high-tide conditions.

In other words, previous floating breakwaters and wave attenuators might perform acceptably at low tide, marginally at middle tides, and imperceptibly at high tide.

Because such floating structures have typically needed to be of considerable draft and surface width (compared to mooring structures), floating wave attenuators have been retained using underwater anchoring, rather than vertical piles penetrating into the seabed (such as is common with mooring structures).

As used herein, "seabed" means an underwater, earthen surface underlying any type of body of water (e.g., a sea, a river, a lake, etc.).

Anchor systems typically permit the float a measure of lateral movement in response to winds and tidal currents, and thus have provided lower performance than pile anchored or fixed attenuators, regardless of tide. Known anchoring systems having taught anchoring lines at higher tides typically provide increased lateral motion at lower tides, due at least in part to slack anchoring lines at low tide. Such lateral motion can even generate waves within the harbor.

Thus, conventional engineering wisdom dictates that floating wave attenuators are of little practical use when wave heights exceed about three feet, and wave periods exceed about three seconds. Such conditions are typically generated around boat harbors where sustained wind speeds can reach (or even exceed) 30 miles per hour over a fetch of several miles.

Accordingly, engineers often turn to fixed panel breakwaters to provide a suitable level of protection for small boat harbors. Since a panel is by definition thin structure, panels typically have a large draft (e.g., extend downwardly to near the seabed). Some block as much as 80 percent (or more) of a vertical water column. Such fixed panels must extend upward, well beyond the highest tide level, to prevent overtopping by large waves at high tide. Consequently, it is not at all uncommon for such walls to tower 25 feet, 30 feet and even more than 40 feet above the lowest tide level.

Fixed panel breakwater designs usually involve treated timber, steel sheet or concrete slab structures fastened to piles driven into the seabed. At low tide, these wall panels obstruct vision, presenting a safety issue, as vessels entering the harbor have little time to react to other boat traffic. Further, such fixed panels create an unsightly, often smelly, assemblage of flotsam and sea-life, casting a sunlight-blocking shadow which hinders the growth of desirable sea grasses.

Over time, marine borers, decay, rusting fasteners, failed welds and weakened concrete with rusting reinforcement accelerate the diminution of the economic life of such breakwaters and wave attenuating structures (normally considered to be 15 to 20 years) without almost constant maintenance.

SUMMARY

Some disclosed principles concern positively buoyant, wave-attenuating panels having opposed, outwardly facing faces separated by a panel thickness. A center-of buoyancy of such a panel can be spaced from a center-of-mass of the panel such that the panel is stably buoyant in an equilibrium orientation when immersed in a liquid, such as, for example, when a plane defined by at least one of the faces is oriented substantially vertically.

Such a panel can comprise a plurality of juxtaposed pipe members so coupled to each other as to define a panel body. In some instances, at least one of the juxtaposed members defines an interior opening fluidically coupled with one of the faces such that the liquid can at least partially fill the interior opening when the panel is released into the liquid. At least one other of the juxtaposed members can comprise a buoyant filler. The filler can comprise an open-cell foam, a closed-cell foam, or both. In some panels, the juxtaposed pipe members extend horizontally when the plane is vertically oriented.

Some panels comprise a ballast member. For example, at least one of the pipe members can have a hollow interior configured to fill with the liquid when the panel is released into a body of the liquid.

Some buoyant panels comprising a plurality of juxtaposed pipe members can define a panel thickness and a draft. In some instances, the draft can be greater than three times the panel thickness.

Some disclosed buoyant panels have a natural frequency of vertical oscillation substantially less than 0.02 Hz. For example, some panels are so configured as to change height above a seabed in response to a change in tide height and to remain at a substantially constant height above the seabed in response to incident waves.

Principles concerning wave attenuators are also disclosed. For example, some wave attenuators, can comprise a first row of support members extending vertically relative to a seabed, and, spaced apart from the first row, a second row of support members extending vertically relative to the seabed. A vertically oriented, movable panel can be positioned between the first row and the second row. The panel can be configured to rise and fall along a substantially vertical plane relative to the seabed.

Each of the support members in the first row can comprise a piling. Each of the support members in the second row can comprise a piling.

Some disclosed wave attenuators comprise a fixed panel extending longitudinally of, and fixedly positioned relative to, the first row and the second row, such that, in a lowermost position, the movable panel is positioned in opposing alignment with the fixed panel. Some fixed panels are so configured as to remain below a mean lower low water height.

In other wave attenuators, each of the support members in the second row comprises an elongate member having a lower end, an upper end and a body extending between the lower end and the upper end, wherein the lower end and the upper end are fixedly attached to a corresponding piling in the first row such that the body is spaced from and substantially parallel to the corresponding piling. The second row can be positioned seaward of the first row. In some instances, the wave attenuator can further comprise a third row of support members positioned opposite the second row (relative to the first row) such that the first row is positioned between the second row and the third row. Each of the support members in the third row can be fixedly attached and parallel to a corresponding piling in the first row. A vertically oriented panel can be positioned between the first row and the third row.

In some wave attenuators, a movable panel is coupled to one or more pilings by a plurality of sleeve-couplers fixedly attached to the movable panel. In these wave attenuators, each sleeve coupler slidably engages a corresponding piling such that the piling extends through the sleeve-coupler and movement of the panel is guided by the piling. In some instances, more than one sleeve-coupler slidably engages the same piling such that the same piling extends through more than one sleeve-coupler.

In some wave attenuators, a movable panel is positively buoyant and has a natural frequency of vertical oscillation substantially less than 0.1 Hz. The movable panel can be so configured as to remain adjacent a free surface of a body of liquid overlying the seabed as the height of the free surface changes in response to tidal action. Such a moveable panel can define a panel thickness. An upper portion of the movable panel can extend above the free surface by a distance greater than three times the panel thickness. In some instances, a lower portion of the movable panel extends below the free surface by a distance greater than the panel thickness.

Some pilings comprise a core portion and a piling sleeve overlying the core portion such that at least a portion of the movable panel rides along the sleeve as the panel moves. The piling sleeve can comprise an HDPE pipe.

The movable panel of some wave attenuators comprises a plurality of juxtaposed elongate pipe members.

The movable panel of some wave attenuators comprises a first sub-panel. Such a wave attenuator can further comprise a second sub-panel. The first and a second sub-panels can be positioned in end-to-end relationship. The first sub-panel and the second sub-panel can be independently movable relative to each other. In some instances, at least one insert can extend between the first sub-panel and the second sub-panel, thereby coupling the first sub-panel to the second sub-panel.

Some wave attenuators comprise a chain coupler extending between the movable panel and at least one support member. The chain coupler can restrict lateral movement of the movable panel in a direction parallel to a length of the panel.

Some disclosed principles relate to wave-attenuating panels. For example, a positively buoyant wave-attenuating panel can comprise a plurality of juxtaposed pipe members fixedly coupled to each other such that the members share a common plane extending through the panel. The panel can be configured to rise and fall along the common plane when the common plane is vertically oriented and the panel is immersed in a body of liquid. The panel can define a panel thickness and a draft substantially greater than the panel thickness.

The juxtaposed members can extend horizontally when the common plane is vertically oriented. At least some of the horizontally extending members can define respective substantially hollow interiors. At least some of the hollow interiors can be filled with an open-cell foam, a closed-cell foam, or both.

Some disclosed panels comprise one or more transverse couplers extending within the panel and transverse relative to at least some of the juxtaposed members.

Some disclosed principles relate to hybrid breakwaters. Such a breakwater can comprise a first wave-attenuating panel fixedly coupled to a seabed, and a second, positively buoyant wave-attenuating panel movably coupled to the seabed.

In some instances, the first panel is supported by a plurality of pilings such that a majority of the first panel remains underwater. In some instances, the second panel is retained such that the buoyant panel floats adjacent a free surface regardless of tide. The second panel can comprise a plurality of horizontally oriented pipe members.

Wave attenuators comprising a plurality of vertically extending piles, a movable wave attenuating panel and a fixed panel are also disclosed. For example, a movable, positively buoyant and vertically oriented wave-attenuating panel can comprise a first group of horizontally disposed pipe members configured to fill with water when the panel is immersed in water and a second group of horizontally disposed pipe members filled with a foam such that the filled pipe members remain substantially free of water when the panel is immersed in water. A natural frequency of vertical oscillation of the immersed panel can be substantially less than 0.08 Hz.

A chain guide can extend around at least one of the piles and at least a portion of the movable wave-attenuating panel such that the wave attenuating panel is laterally retained in a direction parallel to the panel's length. The panel can be laterally retained in a direction perpendicular to the panel's length by the piles such that the panel is configured to rise and fall with a change in a tide and to ride along at least a portion of the piles as the panel rises and falls.

The fixed panel can comprise a plurality of horizontally disposed pipe members, and can be fixedly secured to at least two of the plurality of piles such that a majority of the fixed panel remains submerged regardless of the tide.

The foregoing and other features and advantages of will become more apparent from the following detailed description, which proceeds with reference to the accompanying figures.

BRIEF DESCRIPTION OF THE DRAWINGS

FIGS. 4A and 4B show a first representative embodiment of a wave attenuator as disclosed herein.

FIGS. 5A and 5B show end-elevation views of the wave attenuator shown in FIGS. 4A and 4B.

FIGS. 6A and 6B show a second representative embodiment of a wave attenuator as disclosed herein.

FIGS. 7A and 7B show end-elevation views of the wave attenuator shown in FIGS. 6A and 6B.

FIGS. 8A and 8B show a third representative embodiment of a wave attenuator as disclosed herein.

FIGS. 9A and 9B show end-elevation views of the wave attenuator shown in FIGS. 8A and 8B.

DETAILED DESCRIPTION

The following describes principles related to wave attenuation systems with reference to representative wave attenuation apparatus and methods. As will be apparent to those of ordinary skill upon reviewing the following disclosure, such principles can be embodied in many different configurations and combined in many different methods to accommodate various design objectives. By way of example, wave attenuators adopting one or more of the disclosed principles can be used to attenuate ocean waves in the vicinity of off-shore platforms, in the vicinity of small boat harbors, or both. The principles disclosed herein are described in connection with wave attenuators designed for marine environments. Nonetheless, such wave attenuators are but examples of the wide variety of wave attenuation systems incorporating the disclosed principles.

Overview

Applicants have discovered and disclose herein principles relating to very effective wave attenuation systems. Some of the disclosed principles relate to easy-to-construct, vertically oriented and positively buoyant panel members, as shown, for example, in FIGS. 1A, 1B and 2.

For example, each of the wave attenuators (200, 300, 400) shown in FIGS. 4A through 9B comprise a floating panel member so configured as to remain substantially immovable in response to wave action and yet to rise and fall vertically as tides change. Wave attenuators incorporating such a panel member can attenuate waves while substantially eliminating unsightly, above-water components commonly associated with prior floating wave attenuators and fixed-wall breakwaters. Some wave attenuators configured according to the principles disclosed herein can provide a transmission coefficient of less than 0.24, such as, for example, 0.17. Even lower transmission coefficients are possible with designs incorporating disclosed principles.

Figure 3A:
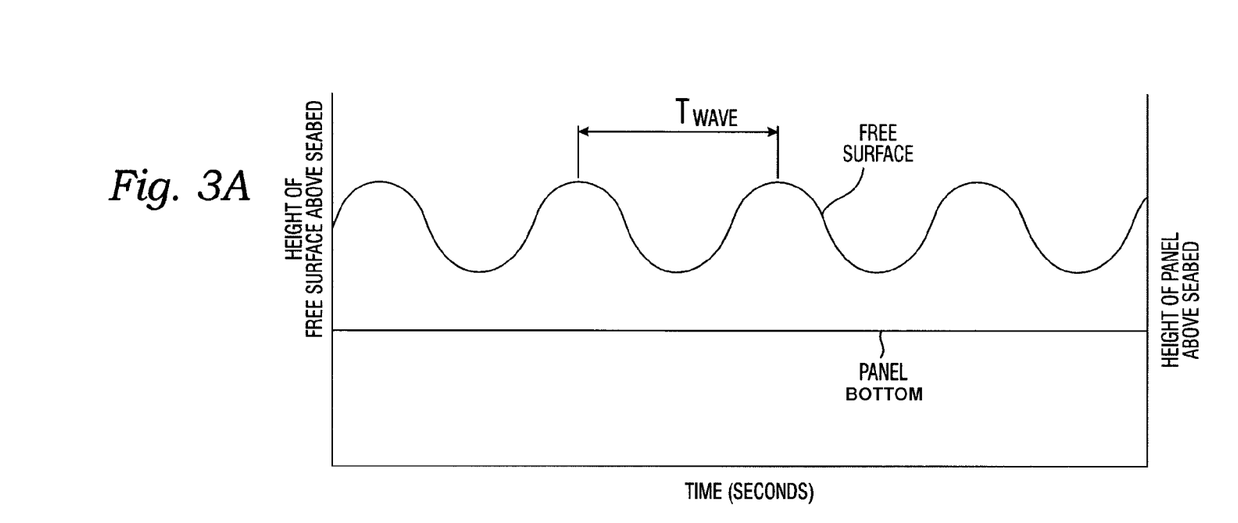
FIGS. 3A and 3B show representative plots of time-varying height of a wave attenuating panel above a seabed in response to relatively higher frequency waves (FIG. 3A) and lower frequency changes in depth (e.g., tidal changes) (FIG. 3B).
Figure 3B:
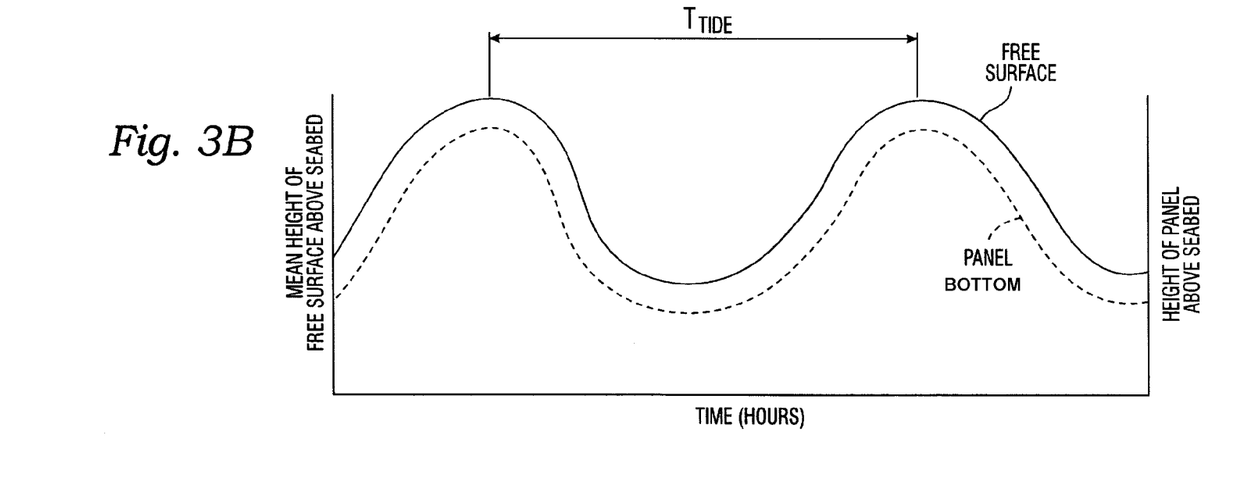

As described in connection with FIGS. 3A and 3B, some disclosed panel members tend to remain substantially immovable in response to incident waves and to attenuate such waves, as indicated in FIG. 3A. Some disclosed panel members also tend to change vertical position in response to low-frequency changes in liquid depth, such as, for example, changes in tide, as indicated in FIG. 3B.

Some wave attenuators comprising one or more such panel members can be positioned near a marina and can provide excellent wave attenuation across a range of tide heights (e.g., from mean lower low water to mean higher high water). Also, since a height of the panel member extending above the water's free surface can remain substantially constant across a range of tides, such wave attenuators can substantially eliminate unsightly features (e.g., a 40 foot wall towering over a low tide). Some wave attenuators also comprise a fixed panel member that remains submerged across most, if not all, tides.

As described more fully below with regard to FIGS. 4A through 9B, a wave attenuator can comprise a support and a vertically oriented, positively buoyant panel member. The support can retain the panel member in a substantially fixed position relative to a seabed, while allowing the panel to rise and fall with changes in tide height.

Some disclosed wave attenuators also comprise a fixed panel member. Such a hybrid wave attenuator can combine the effective wave attenuation properties of a rigid, fixed panel breakwater with the lower visual profile of a floating structure.

Still other wave attenuators can include a fixed panel member without a movable panel member. The fixed panel member can be negatively buoyant, neutrally buoyant or positively buoyant.

Panel Member Construction

Figure 1A:
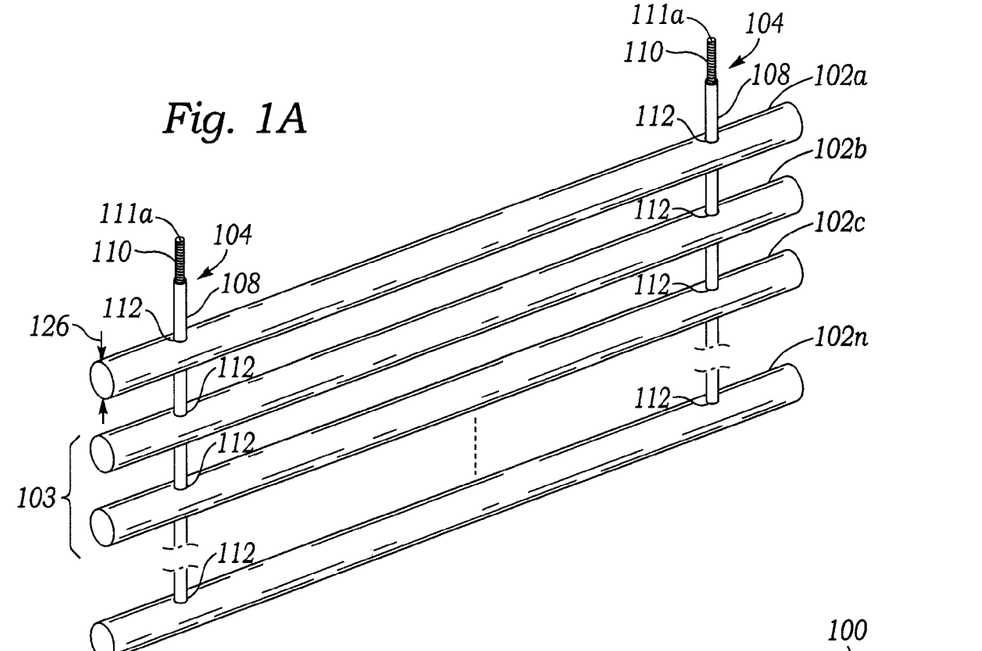
FIG. 1A shows an exploded isometric view of a partial panel assembly as disclosed herein.
Figure 1B:
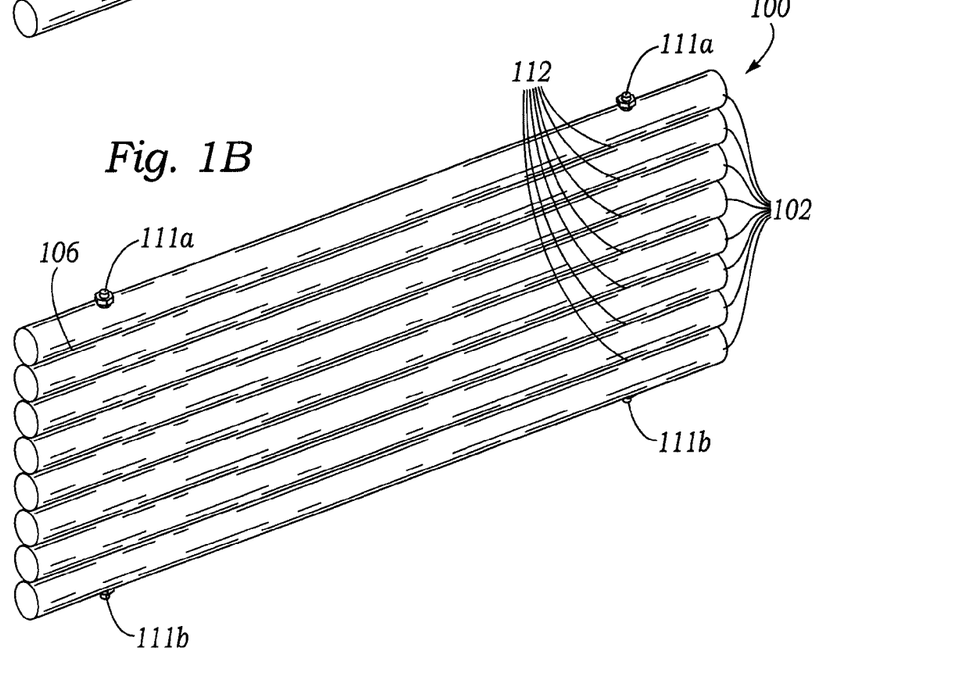
FIG. 1B shows an isometric view of the panel assembly shown in FIG. 1A.

Referring to FIGS. 1A and 1B, floating and fixed panel members will now be described. Such a panel member 100 can be constructed by joining a plurality of horizontally disposed, juxtaposed pipe members 102 (also referred to as "tubular members") in a panel configuration.

A plurality of spaced stitch bolts (sometimes referred to as "stitch pins") 104 can extend transversely through a first outer-most pipe member 102a, through each interior pipe member 102b, 102c and through a second outer-most pipe member 102n positioned opposite the first outer-most pipe member. In some panels, the stitch bolts 104 can extend substantially perpendicularly to the juxtaposed pipe members, as shown in FIG. 1A. In some embodiments, adjacent pipe members (e.g., 102b, 102c) can be welded (e.g., fused) to each other, e.g. to form a laminated seam 106, using known techniques. A measure of redundancy can be added to the panel construction by welding adjacent pipe members to each other and by extending spaced stitch bolts transversely to the welded pipe members.

A stitch bolt 104 can comprise a unitary or a sleeved construction, as shown in FIG. 1A. For example, a stitch bolt 104 can comprise a small diameter (compared to the diameters of the pipe members) tube 108. A measure of redundancy can be added to such a stitch bolt by extending a rod 110 through the interior of the small-diameter tube 108 and coupling the opposing ends 111a, 111b of the rod to the corresponding opposing ends of the tube. In such a construction, the juxtaposed pipe members 102 can be pre-loaded in compression by placing the rod 110 in tension. For purposes of illustration, FIG. 1A shows the pipe members 102 spaced apart from each other along the stitch bolts 104 during assembly of the panel member. The pipe members 102 are desirably (but not necessarily) placed in contact with at least one adjacent pipe member in the assembled panel member 100, as depicted in FIG. 1B.

For example, each joint 112 between a stitch-bolt tube 108 and a pipe member 102 can be welded (or fused). A threaded rod 110 can be inserted into one end of the tube 108 such that the rod extends through the tube and the distal end 111b of the rod extends out of the distal end of the tube. As shown in FIG. 1B, a first washer can be placed over the distal end 111b of the rod, and a first nut can threadably engage the distal end of the rod and urge the first washer against the distal end of the tube. A second washer can be placed over the proximal end 111a of the rod, and a second nut can threadably engage the proximal end of the rod and urge the second washer against the proximal end of the tube 108. As the first and second nuts are tightened, the rod 110 will be placed in tension and the tube 108 (and welded pipe members 102) will be compressed between the washers.

By way of example, each pipe member 102 can comprise a length of plastic pipe formed of, for example, high density polyethylene (HDPE). HDPE is substantially inert and has a very long life when submerged in marine environments. HDPE is also slightly positively buoyant and weldable. HDPE is relatively unsusceptible to marine life, e.g., HDPE is a poor food source. HDPE is also slick and so provides little footing for marine life and any scum or algae can be washed away by water action. HDPE is also suitable for use in direct sunlight as HDPE degrades very slowly (or not at all) in sunlight.

Although HDPE pipes have been described, tubular members formed of other materials can also be used. For example, ultra-high molecular weight polyethylene (UHMWPE), or any other suitable (e.g., non-plastic) material, can be used without departing from disclosed principles. Although panels comprising circular pipe members have been described, panels can comprise pipe or tubular members having any of a variety of cross-sectional shapes (e.g., any polygon, and many arbitrary or random cross-sectional shapes are also compatible with disclosed panel members).

Panel Member Buoyancy

Figure 2:
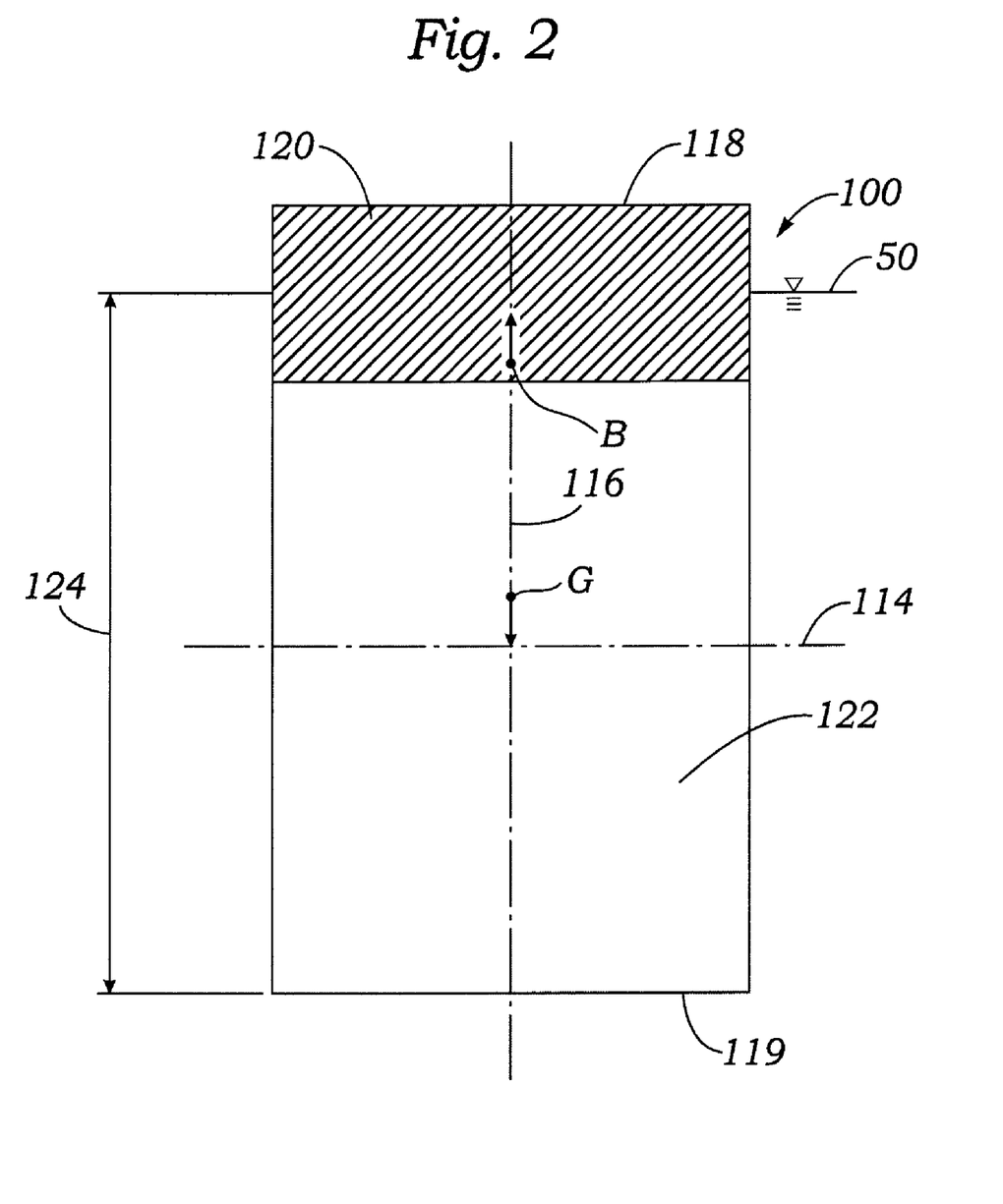
FIG. 2 is a schematic illustration of a front elevation view of a stably buoyant panel assembly of the type shown in FIGS. 1A and 1B.

As indicated in FIG. 2, a panel member 100 constructed as just described can be positively buoyant, neutrally buoyant or negatively buoyant. Since a specific gravity of HDPE is about 0.95 (i.e., the weight of a certain volume of HDPE is about 95% of the weight of an equal volume of water), a panel member comprising HDPE pipe members and several stitch bolts 104 that each comprise an HDPE tube 108 and a threaded steel rod 110 can be slightly positively buoyant. As described below, the buoyancy of such a panel member 100 can be modified to make the panel member both positively buoyant and vertically stable.

A panel 100 comprising a plurality of stitched and/or welded together HDPE pipe members can be substantially symmetric about orthogonal axes 114, 116 lying within the panel. Such a symmetric panel can have a center of gravity G positioned at the volumetric centroid of the panel, and the center of buoyancy B can also be positioned at the volumetric centroid of the panel. The position and orientation of a free-floating panel having its center of gravity and center of buoyancy co-located tends to be unstable, so such a panel would tend to freely roll, pitch and yaw.

Alternatively, the buoyancy of the panel member 100 can be increased and the center-of-buoyancy B can be spaced from the center-of-gravity G, as shown in FIG. 2. For example, one or more of the pipe members 102 adjacent an "upper-most" edge 118 of the panel can be entirely or partially filled with a buoyant material, such as, for example, a closed-cell foam (e.g., polystyrene) as indicated by the shaded region 120 in FIG. 2. The buoyant material can be coated with a polyurethane coating to reduce or eliminate the ability of the buoyant material to absorb water.

Asymmetrically filled pipe members 102 (e.g., pipe members adjacent one edge of the panel being filled with a buoyant material and pipe members adjacent the opposing edge of the panel remaining unfilled) will tend to shift the center-of-gravity G of the panel away from the volumetric centroid of the panel and toward the filled pipe members as shown in FIG. 2. Nonetheless, asymmetrically filled pipes tend to shift the center-of-buoyancy B further toward the "upper-most" edge 118 than the center-of-gravity G, thereby stabilizing the panel when the panel is immersed in liquid and the lower pipe members fill with the liquid.

Stated differently, when immersed in liquid, any unfilled pipe members 122 will tend to fill with water, and any filled pipe members 120 will take on less water than the unfilled pipe members, and in certain embodiments, the filled pipe members tend to remain substantially free of water. A panel 100 having pipe members 120 adjacent an upper-most edge 118 filled with buoyant material will tend to remain adjacent a free-surface 50 when the panel is immersed in a liquid, and any pipe members 102 filled with water tend to sink. Even if the panel member's orientation is disturbed (e.g., the panel 100 is positioned substantially parallel to the seabed (not shown in FIG. 2)), the panel 100 will self-right (i.e., return to a stable orientation having the upper-most edge 118 adjacent a free surface 50) since the center of buoyancy B is spaced from the center-of-gravity G. Such a stably buoyant panel 100 can have a draft 124 in excess of three times the panel's thickness (e.g., in excess of three times the pipe member's diameter 126 (FIG. 1)).

As used herein a panel's "thickness" refers to a dimension separating faces of the panel. For a vertically oriented and at least partially submerged panel oriented perpendicular to an incoming wave's direction of travel, such a "thickness" corresponds to a "width" dimension typically used to describe a dimension along an incoming wave's direction of travel for a conventional, floating mat-like wave attenuator.

In alternative panel embodiments, pipe members adjacent one edge of the panel can be sealed (e.g., by capping off opposing open ends of the pipe members). Such a configuration adds little additional mass to the panel member 100, and thus shifts the center-of-gravity G toward the edge of the panel by only a very short distance. When immersed in a liquid, such as water, the center-of-buoyancy B can shift in relation to the center-of-gravity G, as described above in connection with a panel having pipe members filled with a buoyant material. Such an alternative panel embodiment can also be stably buoyant when the panel member is positioned vertically.

A floating panel member 100 as just described can accommodate extreme low tides (e.g., can become fully grounded) or other extreme loading without suffering significant damage. This allows the panel member 100, unlike other wave attenuators, to resume its shape when water levels return to normal.

Panel Member Dynamics

Although buoyant and much lighter than conventional break waters and other wave attenuating structures, a panel member 100 comprising juxtaposed pipe members 102 can have a low natural frequency of oscillation when installed. As noted above, at least some of the pipe members 122 can fill with water when the panel is vertically oriented. This added water adds to the inertia (e.g. the mass of the panel's constituent elements) that must be overcome in order to move the panel 100.

Stated differently, if a vertical force acting on the panel member 100 is to move the panel member, the force must also move the water filling the pipe members 122. Thus, the effective mass of the panel member 100 increases over the panel's dry mass by the mass of water filling the pipe members 122. In some instances, the effective mass of the panel 100 can exceed three times the panel member's dry mass, thereby reducing the natural frequency of oscillation of the panel member. Such a panel 100 can retain sufficient buoyancy to maintain a significant portion of the panel above a free surface 50, as shown in FIG. 2.

In addition to a large inertia that resists high-frequency motion, it is believed that the undulating panel surface formed by juxtaposed circular pipe members further resists vertical movement of the panel with respect to the surrounding water. Such a surface is believed to interact with the surrounding water as to induce boundary-layer effects that resist vertical movement. Such resistance tends to render the panel less responsive to wave action and less apt to transfer waves past the wave attenuating panel (e.g., into a harbor protected by panel).

Some panel members configured as described above can remain substantially immovable (at least vertically) in response to surface waves and can adjust in elevation above a seabed in response to changes in tide. Panel members that remain substantially immovable in response to wave action attenuate more wave energy than panel members that bob in response to wave action.

Stated differently, a natural frequency of vertical oscillation of such panels 100 can be significantly lower than a frequency ($1/T_{wave}$) of waves to be attenuated, and greater than a frequency ($1/T_{tide}$) of changes in liquid depth. For example, as indicated in FIG. 3A, an open ocean wave frequency ($1/T_{wave}$) can be about 0.10 Hertz (Hz) (corresponding to a wave period $T_{wave}$ of about 10 seconds). In contrast, and assuming that a typical day sees two complete changes in tide, a tidal period $T_{tide}$ can be about 12 hours (corresponding to a tidal frequency of about 0.000023 Hz). Some disclosed panels have a natural frequency of vertical oscillation less than 0.01 Hz, such as, for example, between about 0.005 Hz and about 0.0001 Hz.

A panel member 100 having a substantially greater frequency of vertical oscillation than wave frequency will tend to remain at a substantially constant height above a seabed in response to wave activity, as FIG. 3A indicates. By contrast, a panel having a natural frequency of oscillation substantially less than the frequency of tidal changes will change elevation in response to tidal changes, as indicated by FIG. 3B.

Accordingly some disclosed panel members are configured to maintain a substantially constant distance between an upper-most portion of the panel member and a mean height of the liquid's free surface. Stated differently, a height of the panel member extending above the liquid's free surface can remain substantially unchanged across a range of liquid depths.

First Representative Wave Attenuator

The wave attenuator 200 shown in FIGS. 4A, 4B, 5A and 5B comprises a first, fixed panel 210 and a second, movable panel 220 and a support structure 230. The support structure 230 comprises two rows 230a,b of pile members 231a-h extending vertically from a seabed 10. The rows 230a,b of pile members are oriented transversely (and in some instances, perpendicularly, as shown in the accompanying drawings) to a dominant incoming wave direction (indicated by arrows 15), such that a vector normal to a panel face is oriented facing at least partially into the dominant incoming wave direction. The fixed panel 210 is fixedly attached to one row 230a of pile members and the movable panel 220 is movably attached to the other row 230b of piles such that the panel 220 can rise and fall in a substantially vertical plane with changes in tide.

The detailed dimensions of the illustrated wave attenuator 200 (described below) have been selected based on a mean lower low water (MLLW) depth of about 22 feet, a mean higher high water (MHHW) depth of about 34 feet, and a maximum 100 year wave event wave height of about four feet. Dimensions of particular wave attenuators can vary depending on the particular application.

The piles 231a-h and 232a-h forming each row 230a,b, respectively, are spaced on about 15 foot centers, and extend about 40 feet from the seabed 10. The channel 250 formed between the rows of piles measures about 2 feet wide. Each pile 231a-h, 232a-h has an outer diameter measuring about 16 inches.

The fixed panel 210 can comprise a plurality of fixed panels positioned end-to-end relative to each other. For example, the illustrated wave attenuator 200 comprises two fixed panels 210a,b placed end-to-end and extending the length of the attenuator. Similarly, the floating panel 220 can comprise a plurality of floating panels positioned end-to-end to each other. For example, the illustrated wave attenuator 200 comprises two floating panels 220a,b placed end-to-end to each other and extending the length of the wave attenuator.

Each first, fixed panel 210a,b measures about 50 feet wide by about 18 feet tall by about 1 foot thick. Each fixed panel 210a,b is mounted to a plurality of the seaward guide piles (e.g., 231a, 231b, 231c and 231d) such that a lower most edge 212 of the panel 210a,b is positioned at or near the seabed 10 (e.g., about 3 feet above the seabed), as shown in FIGS. 4B, 5A and 5B. The fixed panels 210a,b can comprise, for example, eighteen 50-foot lengths of juxtaposed, 12-inch diameter HDPE pipe members joined together with 2-inch diameter stitch bolts 104 spaced apart on about 12-foot centers, as described in connection with the panel 100 shown in FIG. 1. Each stitch bolt 104 can comprise a 2-inch diameter stainless steel pipe extending through each of the juxtaposed pipe members.

Each fixed panel 210a,b extends vertically upward from the lower edge 212 to an upper edge 214 that can be positioned at about the height of the mean lower low water (e.g., a depth of a low-tide). The fixed panels remain substantially stationary throughout all tide cycles.

Second, floating panels 220*a,b* (shown in FIGS. 4A and 4B) are slidably coupled to the interior row 230*b* of piles. A cylindrical sleeve member 221 can slidably engage an exterior surface of each respective pile 232*a-h* and fixedly attach to a corresponding floating panel 220*a,b*, thereby slidably coupling the panel to the piles.

For example, a saddle-shaped anchor 239 can extend around an outer surface of a sleeve coupler 221 oriented perpendicularly to a pipe member of the panel 220*a,b* and around an outer surface of the pipe member. Such a saddle-shaped anchor 239 can comprise four U-shaped anchor bolts coupled to each other in a saddle configuration using four turnbuckles. The saddle shaped anchor can be so tightened as to urge the sleeve coupler 221 against the pipe members of the panel by tightening the turnbuckles in a known manner.

The piles 232*a-h* retain the panel 220*a,b* from moving laterally (e.g., parallel to the seabed) when exposed to waves, while allowing the panel to change elevation above the seabed. Stated differently, as the elevation of the free surface 50 changes with the tide, the floating panels 220*a,b* can rise and fall in a substantially vertical plane.

Impact loads between the panel members 220*a,b* and piles 232*a-h* can be somewhat reduced by the annulus of water (not shown) filling any space between each pile's exterior surface and the corresponding sleeve's interior surface. Such a configuration can cushion and slow any reaction from impacts.

As with the panel 100 described with reference to FIG. 2, the floating panels 220*a,b* can have sufficient buoyancy for positioning an upper-most edge 222*a,b* at an elevation of about 3 feet to about 4 feet above the elevation of a mean free surface 50. Each floating panel 220*a,b* can extend downward from the upper-most edge 222*a,b* to a lower-most edge 224*a,b* such that the lower-most edge of the panel slightly overlaps the upper-most edge 214 of the fixed panel 210*a,b* by a few feet at a high tide (MHHW), as shown in FIG. 5A. At lower tides, as the floating panel 220*a,b* descends on the interior guide piles 232*a-h*, the lower-most edge 224*a,b* of the floating panel can approach the elevation of the lower-most edge 212*a,b* of the fixed panel, as shown in FIG. 5B.

The floating panel member can comprise a first group of 18-inch diameter HDPE pipe members and a second group of 12-inch diameter HDPE pipe members, as shown in FIGS. 5A and 5B. One or more (e.g., four) of the upper-most 18-inch diameter pipe members can be filled with foam. The 12-inch diameter HDPE pipe members can be left unfilled, such that when immersed, all of the 12-inch diameter pipe members fill with water.

Figure 4A:
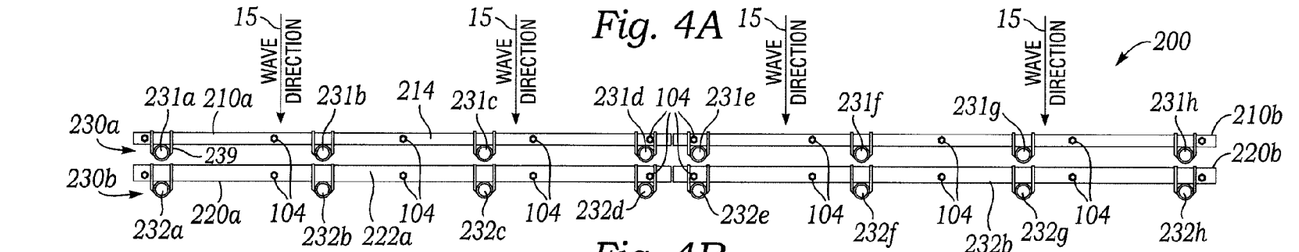
FIG. 4A shows a top plan view of the wave attenuator.
Figure 4B:
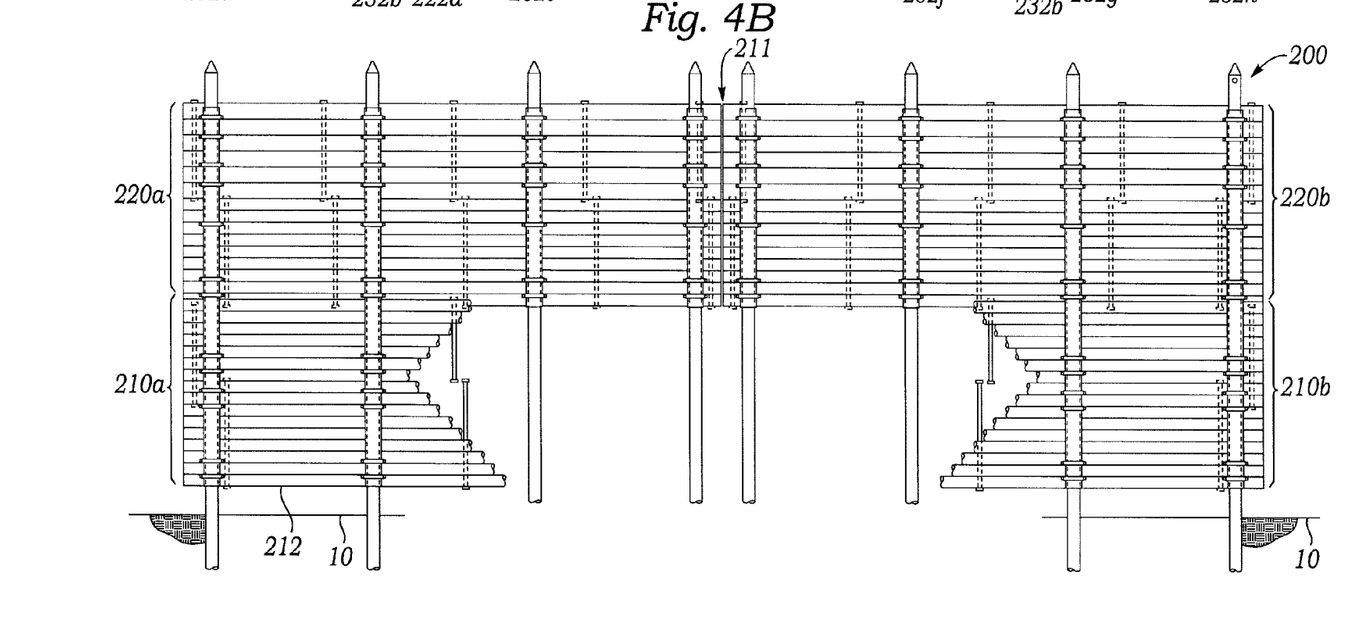
FIG. 4B shows a front elevation view of the wave attenuator (i.e., from the perspective of an incoming wave travelling in a direction normal, or perpendicular, to a panel).
Figure 5A:
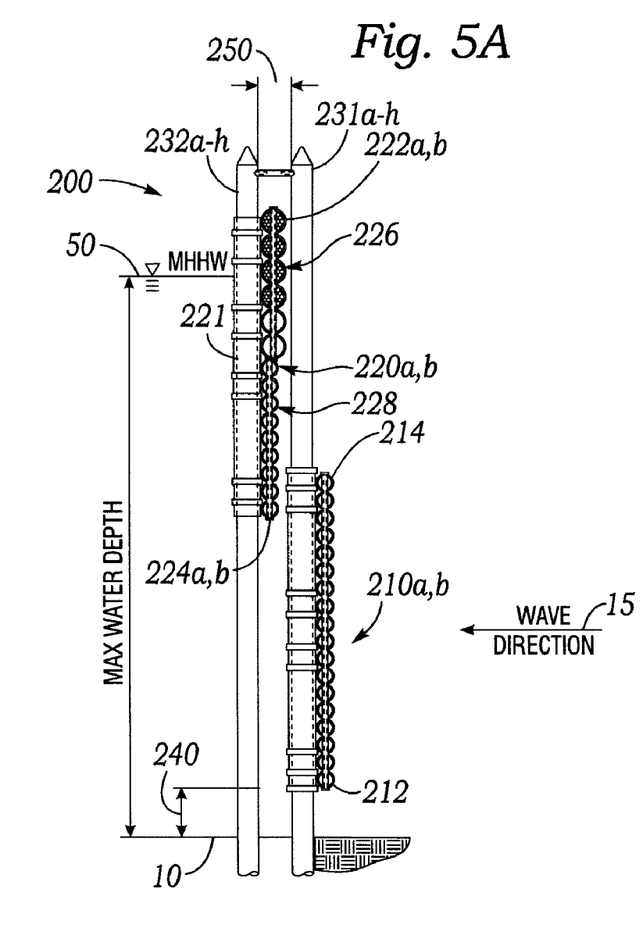
FIG. 5A shows a high-water configuration of the wave attenuator and FIG. 5B shows a low-water configuration of the wave attenuator.
Figure 5B:
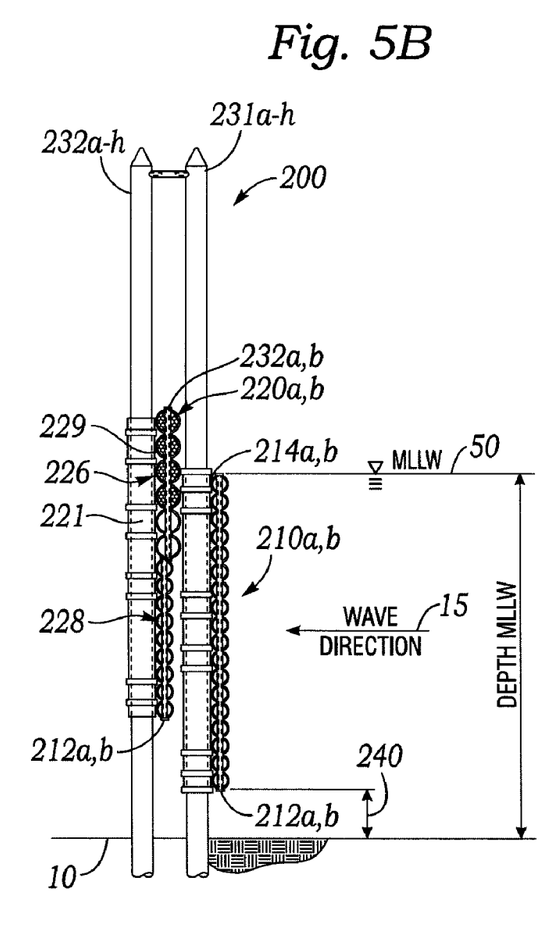

As shown in FIGS. 4A and 4B, some wave attenuators comprise a plurality of fixed panel 210*a,b* and floating panel 220*a,b* assemblies placed in end-to-end relationship with each other. The assemblies of panel members 210*a,b* shown in FIGS. 4A and 1B are spaced from each other by a gap 211 measuring about two inches. The movable panel member 220*a,b* of each of the assemblies is free to move independently of the other movable panel member.

Second Representative Wave Attenuator

Although the fixed panels 210*a,b* in the first representative wave attenuator 200 (shown in FIGS. 4A through 5B) is located seaward of the floating panel 220*a,b*, the floating panel can be located seaward of the fixed panel, such as in the alternative arrangement 300 of stationary 310*a,b* and floating 320*a,b* panels shown in FIGS. 6A, 6B, 7A and 8B. As with the wave attenuator 200 shown in FIGS. 4A through 5B, the fixed panels 310*a,b* of the alternative hybrid wave attenuator 300 remains stationary during all tide cycles, and the floating panel members 230*a,b* are configured to rise and fall with low-frequency changes in water depth (e.g., tide changes).

The support structure of the alternative wave attenuator comprises a single row 330 of 22-inch diameter pile members extending vertically of the seabed 10 by about 40 feet. Each pile member 330*a-h* comprises an outer sleeve (not shown) formed of a 24 inch diameter HDPE pipe member. Each of the pile members 330*a-h* has mounted to it a corresponding seaward panel retaining member 331*a-h* and a corresponding interior panel retaining member 332*a-h*. Each of the panel retaining members 331*a-h*, 332*a-h* is spaced from and anchored to the respective pile 330*a-h*.

In the wave attenuator shown in FIGS. 6A through 7B, each interior retaining member 332*a-h* comprises a 10-inch diameter schedule 40 steel pipe anchored at each end and at a mid-point to the pile 330*a-h*. The interior retaining members 332*a-h* extend parallel to the pile members 330*a-h* and are mounted by their respective lower ends 334*a-h* to the pile about three feet above the seabed 10 by respective lower support brackets. Each interior retaining member 332*a-h* is anchored at its upper end 336*a-h* to the upper end of the respective pile 330*a-h* by a respective upper bracket. Each interior retaining member 332*a-h* is spaced from the pile 330*a-h* sufficiently for the fixed panel member 310*a,b* (e.g., each comprising 17 juxtaposed 12-inch diameter HDPE pipe members) to fit snugly therebetween.

The seaward panel retaining members 331*a-h* each comprise a 14-inch diameter steel pipe (having a ½ inch wall thickness) anchored at each opposing end 333*a-h*, 335*a-h* to the pile 330*a-h*. A 16-inch diameter HDPE pipe forms a sleeve 337 overlying each seaward retaining member. Each seaward panel retaining member 331*a-h* extends from about three feet above the seabed to about the same elevation as the pile member's distal end. Each seaward panel retaining member 331*a-h* is spaced from the respective pile member 330*a-h* sufficiently for a floating panel 320*a,b* (e.g., comprising 12 juxtaposed 18 inch diameter HDPE pipe members) to be positioned therebetween.

As shown in FIGS. 6A through 7B, the floating panel members 320*a,b* are positioned between an array of main piles 330*a-h* and a corresponding array of retaining members 331*a-h* located seaward of the main piles. The sleeved retaining members and piles provide low-friction surfaces for the floating panel members 320*a,b* to ride against as they rise and fall. The fixed panels are positioned between the array of main piles 330*a-h* and the corresponding array of interior retaining members 332*a-h*. Although the floating panels 320*a,b* in the alternative arrangement 300 are located seaward of the fixed panels 310*a,b*, the fixed panels can be located seaward of the floating panels.

Figure 6A:
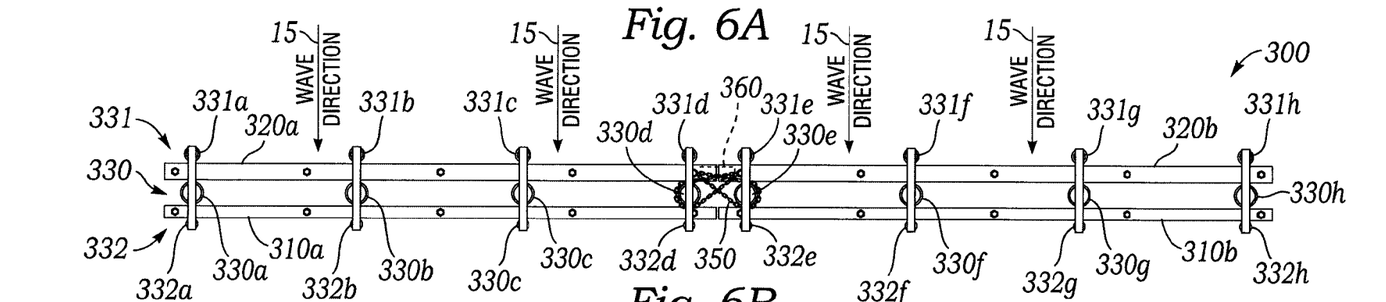
FIG. 6A shows a top plan view of the wave attenuator.

As shown in FIG. 6A, floating panels 320*a,b* can be laterally retained (in a direction parallel to the seabed in the plane of the panels) by way of a chain pile guide 350. Each guide 350 can comprise a closed loop of chain extending around a stitch pin 104 and a pile 330*d,e*.

Breakwaters or wave attenuators of any length can comprise any number of individual panel members (e.g., each panel member can be, for example, 50-feet in length, and a wave attenuator measuring 1000 feet (or more) can comprise 20 such panel members).

For example, individual panel members (or sections) can be positioned end-to-end. Relative motion between the end-to-end panel sections can be reduced and/or eliminated by joining the adjacent ends of pairs of horizontally aligned pipes of adjacent panel sections. For example, respective panels 320*a* and 320*b* can be coupled together such that the movable panels rise and fall together (rather than independently) using respective pipe inserts (also sometimes referred to as "pipe-stops") 360. In one embodiment, for example, as shown in FIG. 6A, a 16-inch diameter pipe insert 360 extends from one 18-inch pipe of one panel section 320a into another 18-inch pipe of an adjacent panel section 320b. The pipe insert 360 interconnects the adjacent ends of adjacent, end-to-end pipes while allowing each panel 320a,b a measure of lateral movement (e.g., the pipes of each panel can slide relative to the insert 360). In addition, the insert 360 can be sized such that the ends of the pipe insert urge against the adjacent stitch bolts 104 before adjacent edges of the panels 320a,b contact each other, thereby preventing direct panel-to-panel contact. Joints limiting relative motion between adjacent ends of horizontally aligned pipes of respective panel sections can reduce damage caused by end-to-end impacts, and can eliminate, or at least reduce, binding of one or more floating panel sections 320a,b.

As noted above with regard to the panel 100 (FIG. 1), the buoyancy of floating panel sections 320a,b can be modified by filling one or more of the upper pipe members with a buoyant material 370 and/or by adding ballast to one or more of the lower pipe members. For example, steel bar stock can be added to a vertical member of an individual floating panel, such as by inserting bar stock into one or more of hollow stitch bolt tubes (e.g., a 2-inch diameter HDPE tube) shown in FIGS. 7A and 7B.

Third Representative Embodiment

Yet another embodiment of a wave attenuator 400 will now be described with reference to FIGS. 8A, 8B, 9A and 9B. The wave attenuator 400 comprises floating panel members 410a,b supported between spaced rows of vertical piles 420a-i, 430a-i. Each panel member 410a,b can be laterally retained to a pile member 420e, 430e by a chain guide 450a,b configured to move (e.g., roll) vertically of the respectively engaged pile member. Thus, except for a slidable contact between the panel members and the piles 420a-i, 430a-i, the only attachment between the panel members and the support structure piles in the illustrated embodiment is provided by the chain guides.

A typical chain guide can comprise a standard welded-link steel (or other metal) chain extending through a plurality of short segments of a tube, such as, for example, 3-inch diameter plastic (HDPE or, alternatively, UHMWPE) pipe. As the panel member 410a,b rises and falls with the tide, the segments of tube roll along the pile 430 such that the chain does not bind against the pile.

Figure 6B:
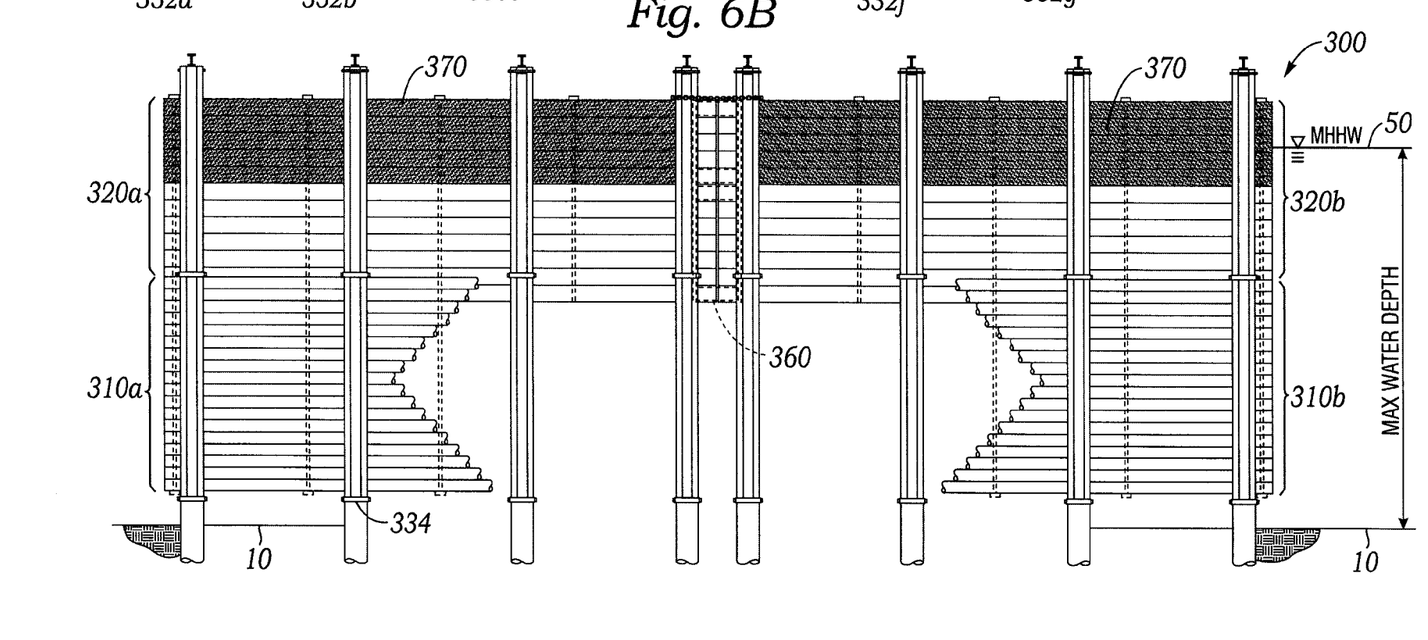
FIG. 6B shows a front elevation view of the wave attenuator.
Figure 7A:
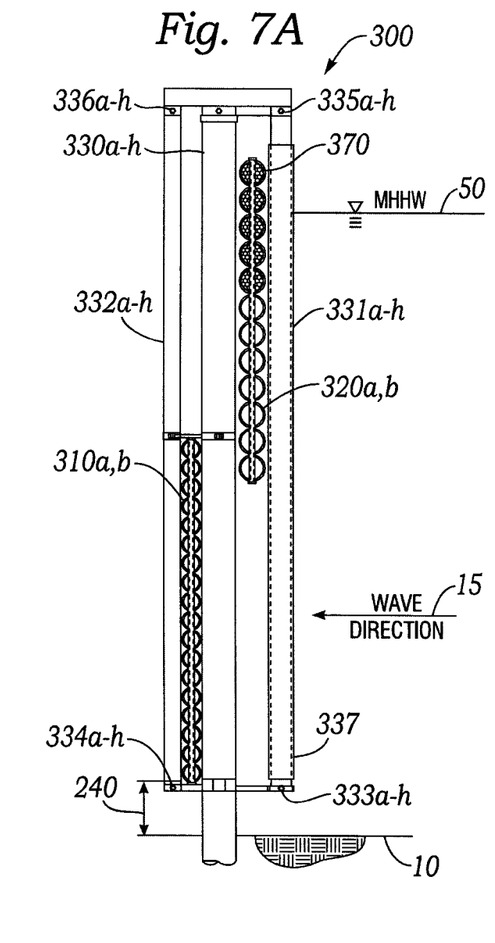
FIG. 7A shows a high-water configuration of the wave attenuator and FIG. 7B shows a low-water configuration of the wave attenuator.
Figure 7B:
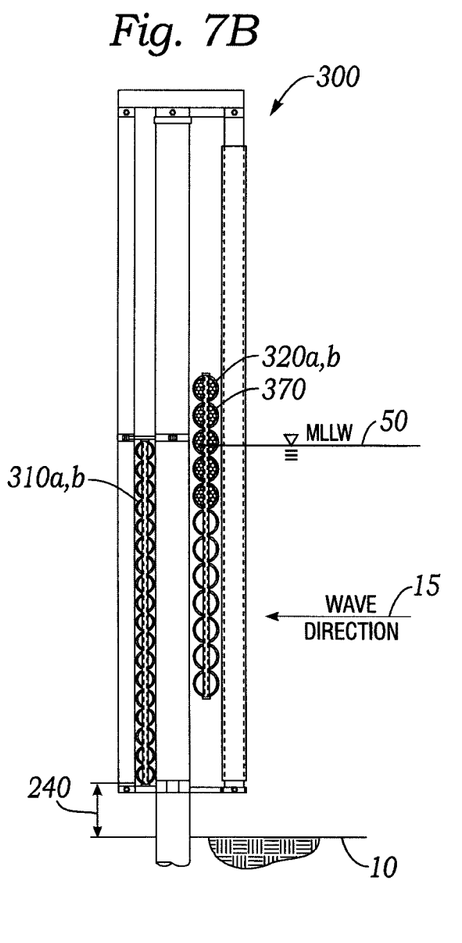
Figures 8A, 8B:
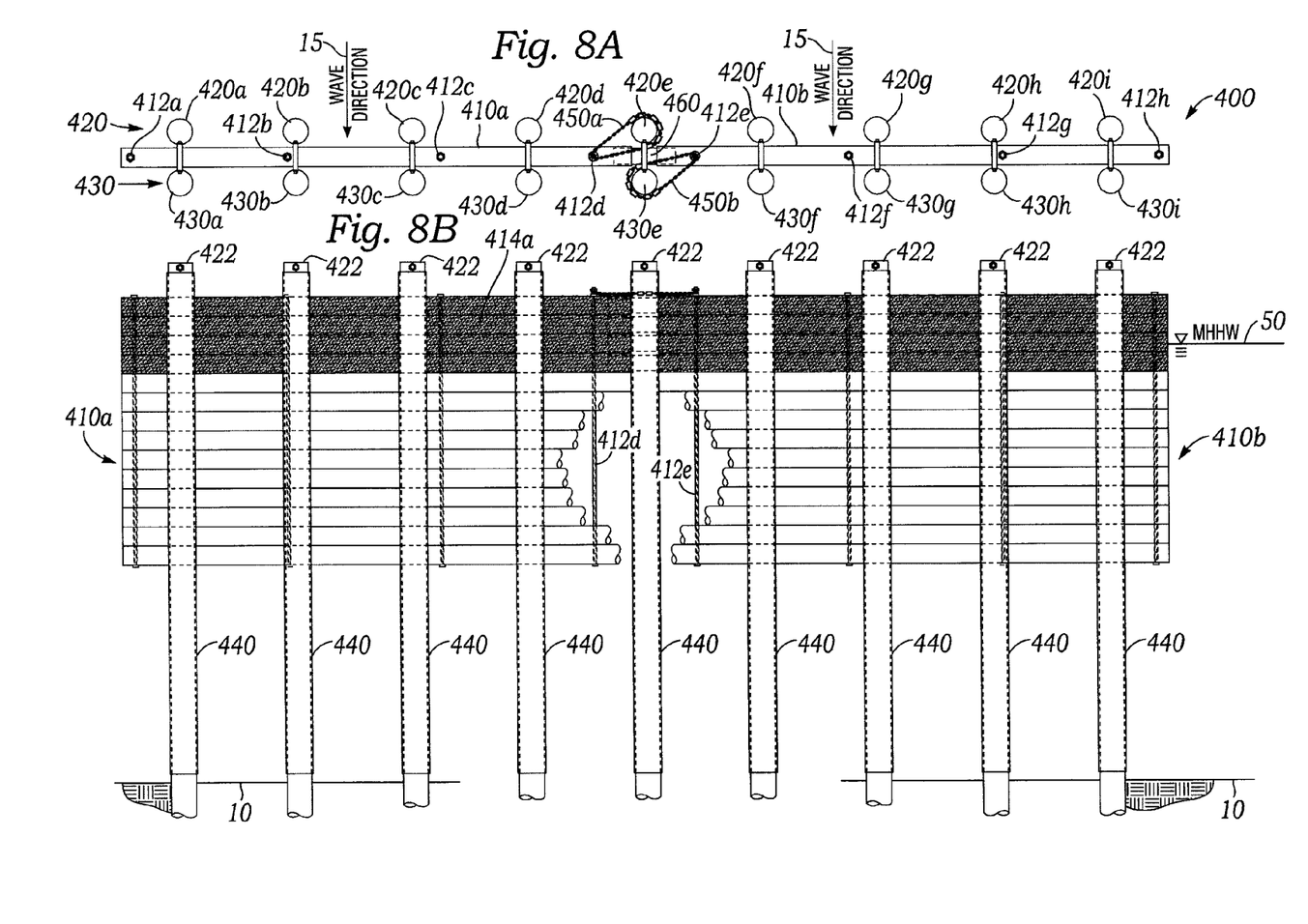
FIG. 8A shows a top plan view of the wave attenuator and FIG. 8B shows a front elevation view of the wave attenuator.
Figure 9A:
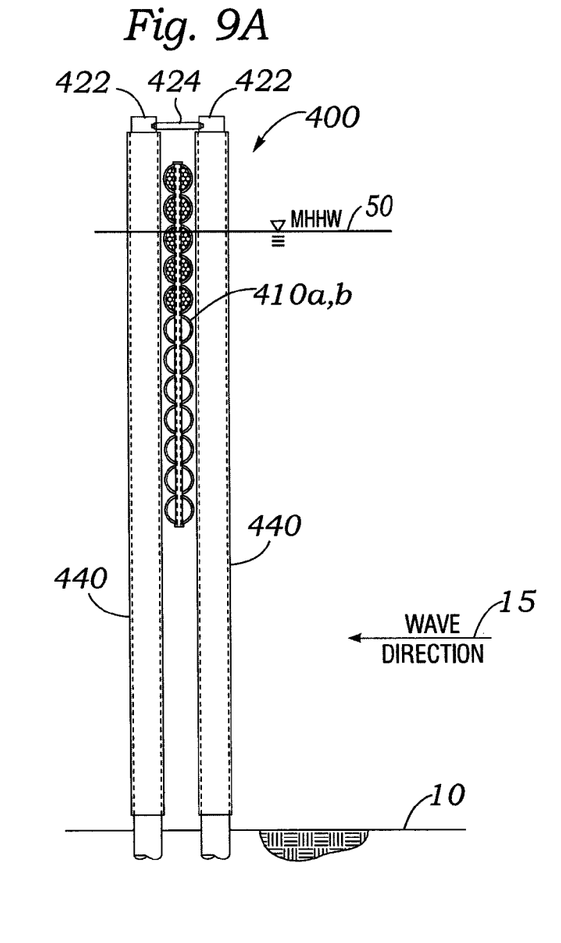
FIG. 9A shows a high-water configuration of the wave attenuator.
Figure 9B:
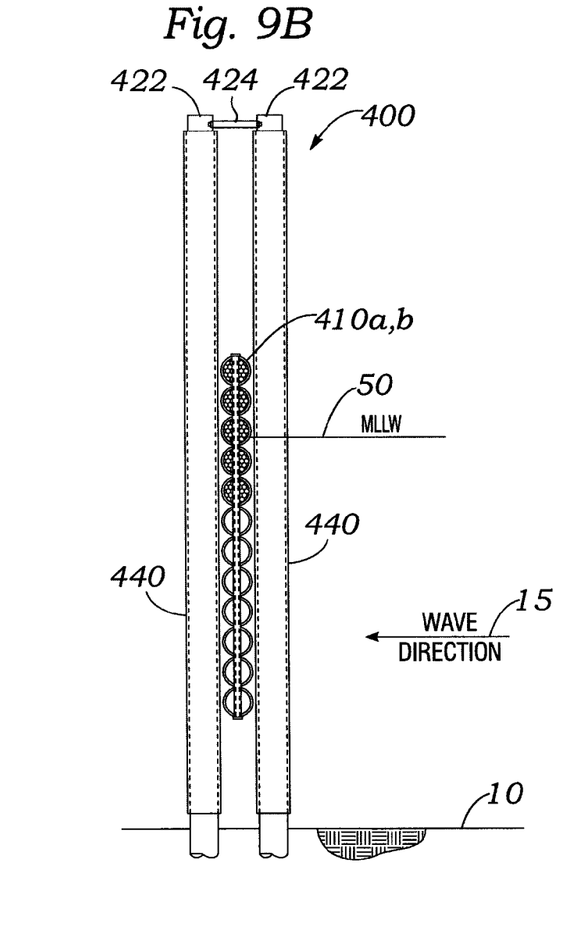
FIG. 9B shows a low-water configuration of the wave attenuator.

Each floating panel 410a,b comprises a construction similar to the panel 100 (FIGS. 1A and 1B). A plurality of juxtaposed pipe members (e.g., fourteen 50-foot lengths of 18-inch diameter HDPE pipe) are held together in a panel configuration stitch bolts 412a-h that each comprise a 4 inch diameter HDPE tube having a 1.5-inch diameter galvanized all-thread rod inserted therethrough). The stitch bolts extend transversely (e.g., perpendicularly, as shown, or, as in some wave attenuators, diagonally) relative to the horizontally extending pipe members. The illustrated stitch bolts 412a-h are spaced on about 12-foot centers along the panels. Adjacent ends of the panels 410a,b are coupled with pipe inserts 460, similar to the pipe inserts 360 joining the panels 310a,b (FIGS. 6A and 6B).

Each of the vertically extending piles 420a-i, 430a-i can comprise a sleeve 440 of 26-inch diameter HDPE pipe overlying a 24-inch diameter steel pipe. The upper end 422 of each pile can be coupled to an opposing pile using a pin (or simple) connection 424 to reduce or eliminate the likelihood of loosening of the piles 420a-i, 430a-i due to cyclic loading of the wave attenuator 400.

Although friction between the HDPE panel members 410a,b and the HDPE pile sleeves 440 is low, the likelihood of panel binding can be further reduced or eliminated by configuring the panel to be stably buoyant, as described above with regard to the panel 100 and FIG. 2. For example, one or more of the pipe members adjacent an upper-most edge 414a,b of the panel 410a,b can be filled with foam (as indicated by the shading in FIGS. 8B, 9A and 9B), ballast (not shown) can be added to one or more of the lower pipes, or a vertically extending member (e.g., all thread) can be added to, for example, a hollow stitch bolt 412a-h.

As with each of the movable panels 220a,b, 320a,b described above, the buoyancy of the vertically oriented panel member 410a,b can be adjusted such that the panel extends above the free surface by a desired distance (e.g., to prevent incident waves from passing over the upper-most edge of the panel). In some examples, such as where a 100 year wave event can be expected to generate a wave less than about 4 feet tall, the panel 410a,b can extend above the mean free surface of the water by a little over 4 feet.

When exposed to incident waves, loads transmitted to the panels 410a,b are supported by the piles. Stated differently, the length of each landward pile 430a-h adjacent the panel 410a,b urges against the panel as the waves push the panel landward, and the length of each seaward pile 420a-h adjacent the panel urges against the panel as the wave action pulls the panel seaward. Such an arrangement distributes loads across the panel faces and avoids any point loading of the panel (such as could occur with the coupling sleeves shown in FIG. 4A through FIG. 5B).

Other Embodiments

Many embodiments of wave attenuators are possible by incorporating one or more of the principles described herein. By way of example, wave attenuators have been described with reference to drawings showing two lengths of panel members oriented substantially perpendicular to an incoming wave direction. Nonetheless, some wave attenuators comprising a floating panel member comprise many lengths of panels positioned in an end-to-end relationship or just a single panel length. Although such wave attenuators can comprise a substantially linear array of panels, wave attenuators comprising disclosed panels can comprise an arcuate array of panels. For example, a joint (or a plurality of joints) between adjacent panel members placed in an end-to-end relationship can be slightly bent (e.g., by about 5-degrees). In some instances, an arcuate wave attenuator can provide comparatively more effective wave attenuation over a wider range of wave directions than a linear wave attenuator.

Panel members as disclosed herein can be designed such that the above-water portion of the panel extends vertically by no more than necessary to prevent a 100 year wave from passing over the above-water portion. In addition, panel members as disclosed herein can be designed to limit out-of-plane deflection in bending to an acceptable level (e.g., no more than 0.5 inch) when exposed to loads expected from a 100-year storm. Such limited deflection of the panel can further reduce transmission of wave energy, adding to the panel's overall wave attenuation effectiveness.

As noted above, panel members can comprise substantially inert polyethylene pipe material having a virtually unlimited lifespan in seawater. In addition, the flexibility of such polyethylene pipe can absorb an accidental impact by a vessel without damaging the panel member, the wave attenuator or the vessel. In addition, corrodible materials can be altogether (or at least substantially) avoided.

Some corrodible supports (e.g., steel-pipe piles) can be renewed by periodic cathodic protection using known techniques. For example, one or more anodes can be provided corresponding to each of the main piles. Galvanized steel parts can be coupled to the anode to allow periodic cathodic treatment for reducing corrosive effects of marine environments. Nonetheless, ferrous materials have been substantially eliminated from the individual panels in the illustrated wave attenuators.

Marine growth can be removed from a floating panel by securing the floating panel to one or more adjacent piles and/or other members at high tide. A suspended panel can be washed during low tide.

This disclosure makes reference to the accompanying drawings which form a part hereof, wherein like numerals designate like parts throughout. The drawings illustrate features of specific embodiments, but other embodiments may be formed and structural changes may be made without departing from the intended scope of this disclosure.

Directions and references (e.g., up, down, top, bottom, left, right, rearward, forward, etc.) may be used to facilitate discussion of the drawings but are not intended to be limiting. For example, certain terms have been used such as "up", "down", "upper", "lower", "horizontal", "vertical", "left", "right", and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and", as well as "and" and "or."

Accordingly, this detailed description shall not be construed in a limiting sense, and following a review of this disclosure, those of ordinary skill in the art will appreciate the wide variety of wave attenuation systems that can be devised and constructed using the various concepts described herein. Moreover, those of ordinary skill in the art will appreciate that the exemplary embodiments disclosed herein can be adapted to various configurations without departing from the disclosed concepts. Thus, in view of the many possible embodiments to which the disclosed principles can be applied, it should be recognized that the above-described embodiments are only examples and should not be taken as limiting in scope. Therefore, we claim all that comes within the scope and spirit of the following claims.

We claim:

1. A wave attenuator comprising:
 a plurality of upright piles extending vertically from a seabed in a body of water and positioned to form a row of piles; and
 a positively buoyant, wave-attenuating floating panel movably coupled to the piles such that the panel is configured to rise and fall with a change in a tide relative to the piles and the seabed in a vertical direction perpendicular to the seabed, the panel comprising multiple horizontally disposed pipe members stacked one on top of each other, the panel having opposed, outwardly facing faces separated by a panel thickness, a center-of buoyancy and a center-of-mass spaced from the center-of-buoyancy such that the panel is stably buoyant in an equilibrium orientation and such that an upper portion of the stack of pipe members extends above a surface of the water substantially by virtue of the buoyancy of the panel, wherein a plane defined by at least one of the faces is oriented substantially vertically when the panel is in the equilibrium orientation, wherein the center-of-buoyancy and the center-of-mass of the panel are horizontally offset to one side of the row of piles.

2. The wave attenuator of claim 1, wherein the pipe members comprise upper pipe members and lower pipe members, and one or more of the upper pipe members house a buoyant filler material.

3. The wave attenuator of claim 2, wherein one or more of the lower pipe members each has a hollow interior configured to fill with water.

4. The wave attenuator of claim 2, wherein the filler material comprises an open-cell foam, a closed-cell foam, or both.

5. The wave attenuator of claim 1, further comprising a ballast member.

6. The wave attenuator of claim 1, wherein the panel defines a panel thickness and a draft, and wherein the draft is greater than three times the panel thickness.

7. The wave attenuator of claim 1, wherein a natural frequency of vertical oscillation of the panel is substantially less than 0.02 Hz.

8. The wave attenuator of claim 1, wherein the panel is so configured as to change height above the seabed in response to a change in tide height and to remain at a substantially constant height above the seabed in response to incident waves.

9. The wave attenuator of claim 8, wherein the pipe members comprise high-density polyethylene pipe.

10. The wave attenuator of claim 1, further comprising a plurality of sleeve-couplers fixedly attached to the floating panel, wherein each sleeve coupler slidably engages a corresponding pile such that the pile extends through the sleeve-coupler and movement of the panel is guided by the pile.

11. The wave attenuator of claim 1, further comprising:
 a first row of upright support members spaced horizontally from the row of piles, each support member mounted in a spaced relationship relative to a corresponding pile and being vertically fixed relative to the seabed;
 a second row of upright support members spaced horizontally from the row of piles on an opposite side of the row of piles from the first row of support members, each support member of the second row mounted in a spaced relationship relative to a corresponding pile and being vertically fixed relative to the seabed;
 a fixed panel mounted between the row of piles and the first row of support members; and
 wherein the floating panel is mounted between the row of piles and the second row of support members for vertical movement relative to the row of piles and the second row of support members in response to a change in the tide.

12. The wave attenuator of claim 11, wherein each upright support member has a lower end mounted to a lower bracket extending from a corresponding pile and an upper end mounted to an upper bracket extending from the corresponding pile.

13. The wave attenuator of claim 11, wherein the support members of the first and second rows each comprises a vertically oriented pipe.

14. The wave attenuator of claim 11, further comprising a chain coupler extending between the floating panel and at least one support member of the second row, wherein the chain coupler restricts lateral movement of the floating panel in a direction parallel to a length of the panel.

15. The wave attenuator of claim 1, wherein the floating panel comprises first and second sub-panels positioned in an end-to-end relationship with respect to each other, and at least one insert extending between a pipe member of the first sub-panel and a pipe member of the second sub-panel, thereby coupling the first sub-panel to the second sub-panel.

16. The wave-attenuator of claim 1, wherein there are substantially no gaps between adjacent horizontally disposed pipe members.

17. A wave attenuator comprising:
a plurality of upright piles extending vertically from a seabed; and
a positively buoyant, wave-attenuating floating panel movably coupled to the piles such that the panel is configured to rise and fall with a change in a tide relative to the piles and the seabed in a vertical direction perpendicular to the seabed, the panel comprising multiple horizontally disposed pipe members stacked one on top of each other, the panel having opposed, outwardly facing faces separated by a panel thickness, a center-of buoyancy and a center-of-mass spaced from the center-of-buoyancy such that the panel is stably buoyant in an equilibrium orientation, wherein a plane defined by at least one of the faces is oriented substantially vertically when the panel is in the equilibrium orientation, wherein a plurality of the pipe members are pre-loaded in compression in the vertical direction perpendicular to the seabed.

18. The wave attenuator of claim 17, wherein the plurality of pipe members are placed in compression against each other.

19. The wave attenuator of claim 17, wherein the plurality of pipe members are pre-load in compression with a plurality of tensioning rods extending vertically through the plurality of pipe members.

20. A wave attenuator comprising:
a plurality of upright piles extending vertically from a seabed; and
a positively buoyant, wave-attenuating floating panel movably coupled to the piles such that the panel is configured to rise and fall with a change in a tide relative to the piles and the seabed in a vertical direction perpendicular to the seabed, the panel comprising multiple horizontally disposed pipe members stacked one on top of each other, the panel having opposed, outwardly facing faces separated by a panel thickness, a center-of buoyancy and a center-of-mass spaced from the center-of-buoyancy such that the panel is stably buoyant in an equilibrium orientation, wherein a plane defined by at least one of the faces is oriented substantially vertically when the panel is in the equilibrium orientation;
the plurality of piles comprises a first row of piles and a second row of piles spaced from the first row; and
the panel is positioned in a space between the first row and the second row and is configured to rise and fall in the space between the first row and the second row in response to a change in the tide.

21. The wave attenuator of claim 20, wherein one or more of the plurality of piles of the first and second rows each has an outer polymeric sleeve to reduce friction between the panel and the piles as the panel rises and falls relative to the piles.

22. The wave attenuator of claim 21, wherein each sleeve comprises a high-density polyethylene pipe.

23. A wave attenuator comprising:
a plurality of upright piles extending vertically from a seabed; and
a positively buoyant, wave-attenuating floating panel movably coupled to the piles such that the panel is configured to rise and fall with a change in a tide relative to the piles and the seabed in a vertical direction perpendicular to the seabed, the panel comprising multiple horizontally disposed pipe members stacked one on top of each other, the panel having opposed, outwardly facing faces separated by a panel thickness, a center-of buoyancy and a center-of-mass spaced from the center-of-buoyancy such that the panel is stably buoyant in an equilibrium orientation, wherein a plane defined by at least one of the faces is oriented substantially vertically when the panel is in the equilibrium orientation;
the plurality of piles comprises a first row of piles and a second row of piles spaced from the first row;
the floating panel is movably coupled to the first row of piles; and
the wave attenuator further comprises a fixed panel that is fixedly attached to the second row of piles.

24. The wave attenuator of claim 23, wherein the fixed panel is so configured as to remain below a mean lower low water height.

25. The wave attenuator of claim 23, further comprising a plurality of sleeve-couplers fixedly attached to the floating panel, wherein each sleeve coupler slidably engages a corresponding pile of the first row such that the pile extends through the sleeve-coupler and movement of the panel is guided by the pile.

26. A wave attenuator, comprising:
a plurality of piles extending from a seabed, wherein the plurality of piles form a row of piles;
a movable, positively buoyant and vertically oriented wave-attenuating panel comprising a first group of horizontally disposed pipe members configured to fill with water when the panel is immersed in water and a second group of horizontally disposed pipe members filled with a foam such that the filled pipe members remain substantially free of water when the panel is immersed in water, wherein a natural frequency of vertical oscillation of the immersed panel is substantially less than 0.08 Hz;
a chain guide extending around at least one of the piles and at least a portion of the movable wave-attenuating panel such that the wave attenuating panel is laterally retained in a direction parallel to the length of the panel;
wherein the panel is laterally retained in a direction perpendicular to the length of the panel by the piles such that the panel is configured to rise and fall with a change in a tide and to ride along at least a portion of the piles as the panel rises and falls; and
a fixed panel comprising a plurality of horizontally disposed pipe members, wherein the fixed panel is fixedly secured to at least two of the plurality of piles such that a majority of the fixed panel remains submerged regardless of the tide;
wherein the fixed panel is on the opposite side of the row of piles from the movable, positively buoyant panel such that a face of the moveable, positively buoyant panel that faces in a horizontal direction toward the fixed panel is horizontally spaced from a face of the fixed panel that faces in a horizontal direction toward the moveable, positively buoyant panel;
wherein a lower portion of the moveable panel extends downwardly past and overlaps an upper portion of the fixed panel at least at low tide.

* * * * *